United States Patent
Lane

(10) Patent No.: US 9,935,685 B2
(45) Date of Patent: Apr. 3, 2018

(54) DC POWER LINE SYNCHRONIZATION FOR AUTOMOTIVE SENSORS

(71) Applicant: QUALCOMM Incorporated, San Diego, CA (US)

(72) Inventor: Frank Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 14/724,487

(22) Filed: May 28, 2015

(65) Prior Publication Data

US 2016/0352388 A1 Dec. 1, 2016

(51) Int. Cl.
*H04B 3/54* (2006.01)
*H04L 7/033* (2006.01)
(Continued)

(52) U.S. Cl.
CPC .............. *H04B 3/54* (2013.01); *H04B 1/3822* (2013.01); *H04J 3/0602* (2013.01);
(Continued)

(58) Field of Classification Search
CPC .............. H04B 3/54; H04B 2203/5408; H04B 2203/5445; H04B 3/00; H04B 3/50; H04B 3/542; H04B 1/3822; H04B 2203/547; H04L 12/403; H04L 7/0008; H04L 7/00; H04L 7/033; H04L 7/08; H04L 7/0331; H04W 56/0015; H04W 56/001; H04J 3/0638; H04J 3/0655; H04J 3/0635; H04J 3/0605; H04J 3/0602; H04J 3/0644; G01S 13/87; G01S 13/931; G01S 17/87; G01S 17/936; G01S 2013/9367
(Continued)

(56) References Cited

U.S. PATENT DOCUMENTS 5,402,394 A 3/1995 Turski
6,347,324 B1 * 2/2002 Eidson ................... G06F 7/544
707/999.007

(Continued)

FOREIGN PATENT DOCUMENTS

EP 2549295 1/2013

OTHER PUBLICATIONS

International Search Report and Written Opinion, PCT/US2016/029604, dated Jul. 11, 2016, 15 pages.
(Continued)

*Primary Examiner* — Michael Thier
*Assistant Examiner* — Rownak Islam
(74) *Attorney, Agent, or Firm* — The Marbury Law Group/Qualcomm

(57) ABSTRACT

A network such as an in-vehicle powerline communication (PLC) network may allow PLC nodes to communicate over existing powerlines. Provided in the present disclosure are exemplary techniques for synchronizing network nodes (e.g., PLC nodes) with a network clock for the network so that data generated at each node may share a common time reference. For example, a synchronization (sync) signal may be generated by a master node and broadcast to other PLC nodes over a PLC channel, which may also carry data frames to and from other PLC nodes. The network clock may be autonomously generated by the master node or may be tied to an external clock.

24 Claims, 6 Drawing Sheets

(51) Int. Cl.

| | | |
|---|---|---|
| *H04B 1/3822* | (2015.01) | |
| *H04W 56/00* | (2009.01) | |
| *H04J 3/06* | (2006.01) | |
| *H04L 7/08* | (2006.01) | |
| *H04L 12/403* | (2006.01) | |
| *G01S 13/93* | (2006.01) | |
| *G01S 17/87* | (2006.01) | |
| *G01S 17/93* | (2006.01) | |
| *G01S 13/87* | (2006.01) | |

(52) U.S. Cl.
CPC .......... *H04J 3/0655* (2013.01); *H04L 7/0331* (2013.01); *H04L 7/08* (2013.01); *H04L 12/403* (2013.01); *H04W 56/0015* (2013.01); *G01S 13/87* (2013.01); *G01S 13/931* (2013.01); *G01S 17/87* (2013.01); *G01S 17/936* (2013.01); *G01S 2013/9367* (2013.01); *H04B 2203/547* (2013.01); *H04B 2203/5408* (2013.01); *H04B 2203/5445* (2013.01); *H04J 3/0644* (2013.01)

(58) Field of Classification Search
USPC ........................................................ 370/503
See application file for complete search history.

(56) References Cited

U.S. PATENT DOCUMENTS

| | | | |
|---|---|---|---|
| 6,577,231 B2 | 6/2003 | Litwin, Jr. et al. | |
| 7,305,476 B2 | 12/2007 | Home et al. | |
| 7,310,327 B2 | 12/2007 | Fehr | |
| 8,050,881 B1 | 11/2011 | Yeung et al. | |
| 8,279,896 B2 | 10/2012 | Etkin et al. | |
| 8,504,864 B2 | 8/2013 | Menon et al. | |
| 2004/0177285 A1 | 9/2004 | Klotz et al. | |
| 2006/0072695 A1* | 4/2006 | Iwamura | H04B 1/66 375/354 |
| 2006/0152344 A1 | 7/2006 | Mowery, Jr. | |
| 2006/0233203 A1* | 10/2006 | Iwamura | H04N 21/2368 370/516 |
| 2007/0025391 A1 | 2/2007 | Yonge | |
| 2008/0240163 A1* | 10/2008 | Ibrahim | H04J 3/0664 370/503 |
| 2011/0172849 A1 | 7/2011 | Rotaru et al. | |
| 2012/0140861 A1 | 6/2012 | Menon et al. | |
| 2013/0308660 A1* | 11/2013 | Huang | H04J 3/0664 370/518 |
| 2014/0334477 A1 | 11/2014 | Stählin et al. | |
| 2015/0270867 A1 | 9/2015 | Young et al. | |

OTHER PUBLICATIONS

Bassi, E., et al., "Powerline Communication in Electric Vehicles," IEEE, Proceedings of the IEEE International Electric Machines and Drives Conference (IEMDC), (Jun. 6, 2009), pp. 1749-1753.

Tuohy, S., et al., "Intra-Vehicle Networks: A Review," IEEE Transactions on Intelligent Transportation Systems, vol. 16, No. 2, (Apr. 1, 2015), pp. 534-645.

Zarikoff, B., et al., "Dynamics of Contention Free Period Reservation in IEEE 1901 Networks," 16th IEEE International Symposium on Power Line Communications and its Applications (ISPLC), (Mar. 27, 2012), pp. 242-247.

D'Orazio, L., et al., "Sensor Networks on the Car: State of the Art and Future Challenges," IEEE Conference on Design, Automation & Test, (Mar. 14-18, 2011), 6 pages.

Tuohy, S., et al., "Intra-Vehicle Networks: A Review," IEEE Transactions on Intelligent Transportation Systems, (2014), 12 pages.

* cited by examiner

DC POWER LINE SYNCHRONIZATION FOR AUTOMOTIVE SENSORS

BACKGROUND

1. Field of the Disclosure

The present application generally relates to automotive electronics and, more specifically, to systems and methods for using a powerline communication (PLC) channel in an automotive network to synchronize network nodes such as sensors and actuators distributed over an automobile.

2. Description of Related Art

Vehicles or automobiles are now increasingly equipped with environmental perception sensors (e.g., radar, lidar, and cameras) for various uses such as in advanced driver assistance systems (ADAS) and automated driver systems. These sensors may be used to sense or detect the world around the vehicle and provide inputs for algorithms, which may detect pedestrians, other vehicles, and roadway obstacles. For example, an adaptive cruise control system on a vehicle may use a lidar device mounted on the front of the vehicle (e.g., the bumper) to monitor a distance between the vehicle and another vehicle in front. When the vehicle in front suddenly slows down, the lidar may detect that the distance is getting too close and may immediately trigger an autonomous cruise control (ACC) system to apply the brakes to slow down the vehicle. As vehicles today are often equipped with multiple sensors, it may be useful to combine data from several sensors to create robust detection systems that work under varying conditions (e.g., different speeds, weather, and road conditions).

SUMMARY

Disclosed herein are apparatuses, systems, and methods for using a network clock to synchronize network nodes in a network such as a powerline communication (PLC) network, which may be deployed in a vehicle. The PLC network may comprise a plurality of nodes including a first node and a second node. According to one aspect, the first node may comprise a transmitter configured to transmit a synchronization (sync) signal to a second node over a network channel (e.g., a PLC channel). The sync signal may indicate a network clock for the PLC network. The first node may further comprise a receiver coupled to the transmitter and configured to receive data frames from the second node over the same network channel (e.g., the PLC channel).

According to another aspect, the second node may be a slave PLC node configured to receive a sync signal from a master node over a PLC channel. The second node may further send data frames to the master node or a third node over the same PLC channel.

According to another aspect, a method of synchronization may be implemented by a first node. The method may include: generating a central beacon comprising information that indicates a network clock; and broadcasting the central beacon and data frames to a plurality of additional nodes over one common PLC channel.

According to another aspect, a method of synchronization may be implemented by the second node. The method may include: receiving, from a PLC channel, a sync signal that establishes a network clock for the PLC network; generating a local sync signal based on the network clock; and sending the local sync signal to a device coupled to the second node for controlling a sampling clock of the device to be in sync with the network clock.

BRIEF DESCRIPTION OF DRAWINGS

Features, aspects, and embodiments of the disclosure are described in conjunction with the attached drawings, in which.

Figure 1:
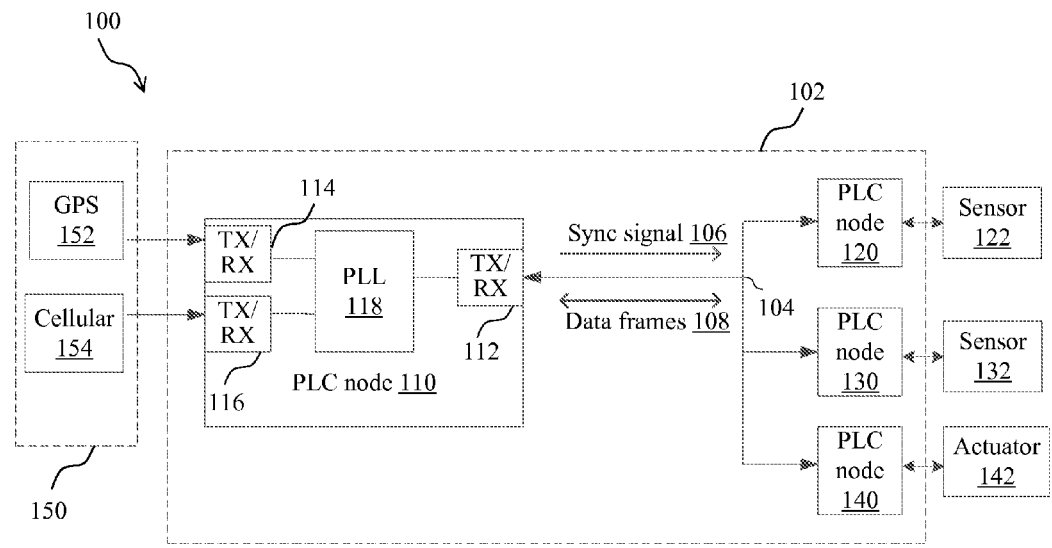
FIG. 1 shows a block diagram illustrating an exemplary system for communicating between network nodes.

These exemplary figures and embodiments are to provide a written, detailed description of the subject matter set forth by any claims in the present application. These exemplary figures and embodiments should not be used to limit the scope of any such claims.

Further, although similar reference numerals may be used to refer to similar structures for convenience, each of the various example embodiments may be considered to be distinct variations. When similar reference numerals are used, a description of the common elements may not be repeated, as the functionality of these elements may be the same or similar between embodiments. In addition, the figures are not to scale unless explicitly indicated otherwise.

DETAILED DESCRIPTION

Establishing an accurate common time base for sensor data fusion and other applications in a vehicle remains a technical challenge. One possible technique is to timestamp sensor data when it is received by a central fusion processor. However, this technique may not compensate for transport latency and variability in the connection from a sensor to the processor. Further, since data may sometimes need to be collected with minimum latency at the fusion processor, this technique may not allow processing in the sensor that introduces variable latency. A second possible technique is to synchronize sensors with a sync command sent from the central fusion processor to a respective sensor over an extra dedicated data link. The second technique may add cost and may fail to compensate for the variable time at which the sync commands are delivered to each sensor.

According to exemplary embodiments disclosed herein, in a powerline communication (PLC) network deployed in a vehicle, a master node (e.g., central processor) may broadcast a synchronization (sync) signal to other network nodes distributed around the vehicle over a PLC channel, comprising direct current (DC) powerlines. The sync signal may establish or indicate a network clock for the PLC network by providing a time reference common to all nodes. The PLC channel may carry both sync signals and data frames, therefore removing the need for extra communication links.

FIG. 1 shows a block diagram illustrating an exemplary system 100 for communication between PLC network nodes. The system 100 may be an automotive network or other vehicular network mounted on a vehicle and may comprise a network channel such as a PLC network 102. A vehicle may refer broadly to any movable object such as a car or automobile, a motorcycle, a boat or ship, an airplane, etc. Nevertheless, the disclosed principles may be applied to other types of PLC networks deployed in a home, a workplace, or other environments having a powerline infrastructure. The PLC network 102 may carry data signals over a PLC channel that also simultaneously distributes electric power to PLC nodes. PLC may sometimes be alternatively referred to as mains communication, powerline telecommunications, powerline carrier, or powerline networking (PLN), and the like.

The PLC network 102 comprises a plurality of PLC network nodes, such as PLC nodes 110, 120, 130, and 140, which may be coupled to one another via one or more PLC channels, such as a PLC channel 104. The PLC channel 104 may be implemented as a direct current (DC) power network comprising powerlines, dedicated twisted pair, or any other medium suitable for delivering electric power and data signals. The PLC channel 104 may include separate lines or wires that are connected to different PLC nodes. Each line or wire may be considered part of the PLC channel 104.

One PLC node 110 may serve as a master node, while the other PLC nodes 120, 130, and 140 may serve as secondary or slave nodes. The master node may be any suitable device that provides central control or processing functions such as sending synchronization signals to other PLC nodes, and receiving and synthesizing sensor data from the other PLC nodes. For example, the master node may be an Electronic Control Unit (ECU) that controls one or more of the electrical systems or subsystems in a vehicle. Alternatively, the PLC nodes may operate in a peer to peer network architecture in which one of the nodes may control timing of the PLC network 102. Further, the master node (or the other PLC nodes) may be an Engine Control Module (ECM), a Powertrain Control Module (PCM), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), or any other suitable module or unit that uses powerlines for communication.

According to one aspect, the PLC node 110 may broadcast a sync signal 106 over the PLC channel 104 to the PLC nodes 120, 130, and 140, which may be distributed throughout the vehicle. The sync signal 106 may specify a network clock to establish frame timing for PLC communications in the PLC network 102. The PLC node 110 may further receive data signals (e.g., data frames 108) from (or send data signals to) the PLC nodes 120, 130, and 140 over the same PLC channel 104.

Carrying sync signals and data frames over the same PLC channel 104 may bring about various advantages compared to carrying them over separate channels or mediums (e.g., delivering power over power feed lines and communicating data signals over data links). For example, instead of needing multiple transceivers to monitor the sync signal 106 and data frame 108, one transceiver 112 coupled to the PLC channel 104 may be able to monitor both synchronization and data communications, thereby leading to potential cost saving. For another example, traditional power feed lines may inherently have limited data communication bandwidth due to heavy bandwidth filtering to remove potential high-frequency noise in power pulses. In contrast, the PLC channel 104 may have a relatively wider bandwidth and thus higher timing accuracy.

To facilitate communication with other PLC nodes 120, 130, and 140 and potentially with external sources, the PLC node 110 may comprise one or more transceivers, such as transceivers 112, 114, and 116. The transceiver 112 may include a transmitter (TX) for transmitting data to the PLC nodes 120, 130, and 140 and a receiver (RX), coupled to the transmitter, for receiving data from the PLC nodes 120, 130, and 140. The transceiver 112 may use one or more transmitting circuits and/or receiving circuits to communicate with the PLC nodes 120, 130, and 140. Further, the transceivers 112, 114, and 116 may be one combined module or as separate modules. For example, a transceiver may be part of an input/output (I/O) port, e.g., on a PLC modem. Although not shown in FIG. 1, the other devices such as the PLC nodes 120, 130, and 140, sensors 122 and 132, and actuator 142 may comprise respective transceivers to facilitate data communication.

The PLC network 102 may have a network clock (or network time) tied to an external time reference or autonomously generated by the PLC node 110. In automotive applications, where the PLC network 102 may be implemented on a DC power distribution network or dedicated twisted pair, the PLC network 102 may use a time reference from an internal or external source. In other deployments, where alternating current (AC) powerlines are used, the period of a line voltage may serve as a time reference.

According to one aspect as shown in FIG. 1, the PLC node 110 may have one or more receivers configured to receive an external sync signal from an external source 150. The external sync signal may specify a universal or global clock (or global time) established by satellite or cellular network. For example, the transceiver 114 may receive an external sync signal carrying a global clock from a global positioning system (GPS) device 152, or the transceiver 116 may receive the global clock from a cellular modem 154. After receiving the global clock, the PLC node 110 may establish a global time reference for the PLC network 102 by tying its network clock to the global clock.

In one example, the PLC node 110 may use a phase locked loop (PLL) 118 to substantially lock its network clock to the global clock. The PLL 118 may sample the global clock and generate a beacon time stamp. The beacon time stamp may be generated based on the global clock such that the network clock is a direct representation of the global clock. To remove the need for locking, alternatively, a sample of the global clock may be broadcast, in a beacon time stamp, to PLC nodes 120, 130, and 140 so that the global clock may be derived from the network clock by each of the PLC nodes 120, 130, and 140.

The transceiver 114 and/or the transceiver 116 may establish connectivity to the external source 150 (e.g., internet) via a wireless connection, which may use a cellular protocol such as a Second Generation (2G), a Third Generation (3G), or a Fourth Generation (4G) Long-Term Evolution (LTE) protocol. Further, the PLC node 110 may work as an access point that provides wireless connectivity via Wi-Fi to external devices. The PLC node 110 may, additionally or alternatively, provide wired connectivity (e.g., Ethernet) to external devices.

In some scenarios, an external clock may be used, but it need not be truly global or universal. For example, when a vehicle communicates with another vehicle (or another device such as a computer or a media player), multiple vehicles may establish a common time reference, e.g., for synthesizing sensor data from different vehicles. In this case, the network clock for one PLC network may be used as an external clock to synchronize another PLC network. Vehicle to vehicle communication links, such as Wi-Fi or Dedicated Short-Range Communications (DSRC), may be used to exchange timing information for the purposes of measuring range between vehicles, or for communicating any sensor data.

Figure 2:
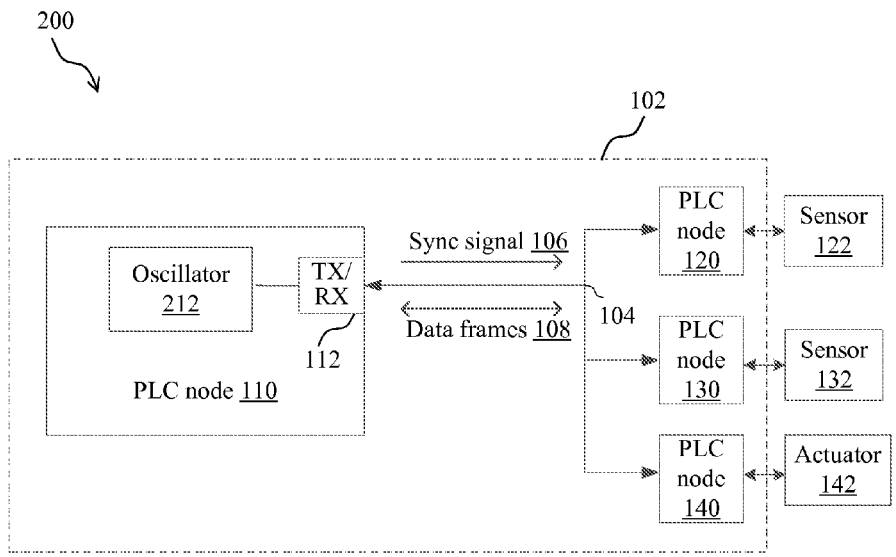
FIG. 2 shows a block diagram illustrating an exemplary system in which a network clock is generated from an oscillator in a PLC master node.

In some scenarios, an external clock may not be used and a master node can autonomously set a network clock. FIG. 2 shows a block diagram illustrating an exemplary system 200, where the network clock is generated from an oscillator 212 in the PLC node 110. Other aspects of the system 200 may be similar to the system 100 in FIG. 1. The oscillator 212 may be a crystal oscillator or any other type of electronic oscillator circuit. For example, the oscillator 212 may use the mechanical resonance of a vibrating crystal made of piezoelectric material to create a clock with a precise frequency. For another example, the oscillator 212 may be a voltage-controlled oscillator (VCO) whose oscillation frequency is controlled by a voltage input. The VCO may be implemented as part of a PLL. As one of ordinary skill in the art would recognize similarities between the system 100 and the system 200, repetitive details are omitted in the interest of conciseness.

Time synchronization may be useful for a variety of applications such as sensor data combination or fusion. Note that timing control and sensor data fusion may be implemented on the same node or on different nodes. As shown in FIG. 1, for example, the system 100 may further comprise other devices such as a sensor 122 coupled to the PLC node 120, a sensor 132 coupled to the PLC node 130, and an actuator 142 coupled to the PLC node 140. Any suitable type of sensor (e.g., image sensor, fuel level sensor, temperature sensor, compass, etc.) and actuator (e.g., switch, fuel injector, air conditioner unit, etc.) may be implemented. The devices 122, 132, and 142 may be considered as part of, or coupled to, the PLC network 102.

In sensor data fusion, synchronization may place multiple data streams into a common reference frame and may involve a geometric transformation from a sensor coordinate frame to an automobile coordinate frame. However, when the automobile and/or surrounding objects are moving, sensor data sampled at different points in time may need to be motion compensated before sensor data fusion.

Motion compensation may be useful in sensor data fusion applications. For example, a vehicle may synthesize data from four wide-angle cameras to create a 360° bird's eye view of the vehicle from top-down. In stitching together images from multiple cameras, overlapping areas of the images may need to be removed. If images are sampled at different times while the vehicle is moving, surrounding objects (e.g., road or other cars) may move across images, which may lead to discontinuity in the stitched image if the motion is not properly compensated. For another example, in a visual radar processing operation, two forward-looking cameras may be used cooperatively to measure a distance between the vehicle and another vehicle in front. If sampling timing is not aligned between two cameras, it may be difficult to correlate images and get an accurate measurement of relative positions between the two cameras. Embodiments disclosed herein may establish an accurate common time base for motion compensation.

The PLC node 110 may transmit a sync signal to the other PLC nodes 120, 130, and 140 via any suitable communication protocol or mechanism. In some embodiments, the PLC node 110 may coordinate transmissions between different nodes using time division multiple access (TDMA), such that each PLC node may reserve portions of a fixed-length transmission period to transmit over the PLC channel 104. For example, the PLC node 110 may periodically transmit sync pulses to the PLC nodes 120, 130, and 140, and each PLC node may reserve a portion of time between sync pulses during which time it may transmit data back to the PLC node 110.

Figure 3:
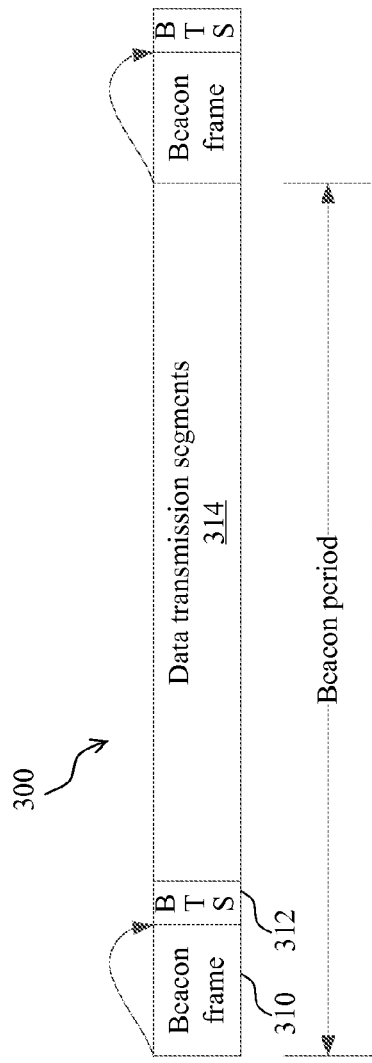
FIG. 3 illustrates an example of a sync signal.

FIG. 3 illustrates an example of a sync signal 300, which may be broadcast over any number of beacon periods. The sync signal 300 may take the form of one or more central beacons (sometimes referred to as discovery beacons), which may be utilized by the PLC node 110 to establish media access control (MAC) framing and scheduling. A central beacon may be transmitted, repeatedly or periodically, with an interval of about 33.33 milliseconds (msec), about 40 msec, or any other suitable duration. In each beacon period, a beacon frame 310 may carry or be coupled to a beacon time stamp (BTS) 312 derived from the network clock of the master node. Data transmission segments 314 (e.g., data frames) may follow the beacon time stamp 312 between beacon frames, and may be sent over the same PLC channel with beacon frames. Any time stamp disclosed herein may be formulated or packaged flexibly. For example, the beacon time stamp 312 may be transmitted as a header or other fields in the beacon frame 310, or as separate frames following the beacon frame 310, or via any other suitable manner.

In some embodiments, slave nodes (e.g., PLC nodes 120, 130, and 140) may receive the network clock from the master node (e.g., PLC node 110) and calibrate their respectively local or internal clocks. For example, the local clocks may operate with less than about ±1 part-per-million (ppm) frequency error, which translates into a timing error of less than about 0.04 microseconds (usec) between beacon intervals. Note that a beacon mechanism may be used independent of whether or not there is an external source providing the global clock.

In some scenarios, even when an external source is used (e.g., as shown in FIG. 1), it may be unnecessary for the master node to lock its network clock to the external source. For example, some scenarios may only require a clock for the PLC network 102 to be about ±25 ppm in sync with a global clock, which translates into a timing error of less than about 1 usec over a beacon period—accurate enough for many applications. When the master node does not lock its network clock to the external reference, the global clock may be sampled synchronously with the network clock at the beacon interval and broadcast separately.

Figure 4:
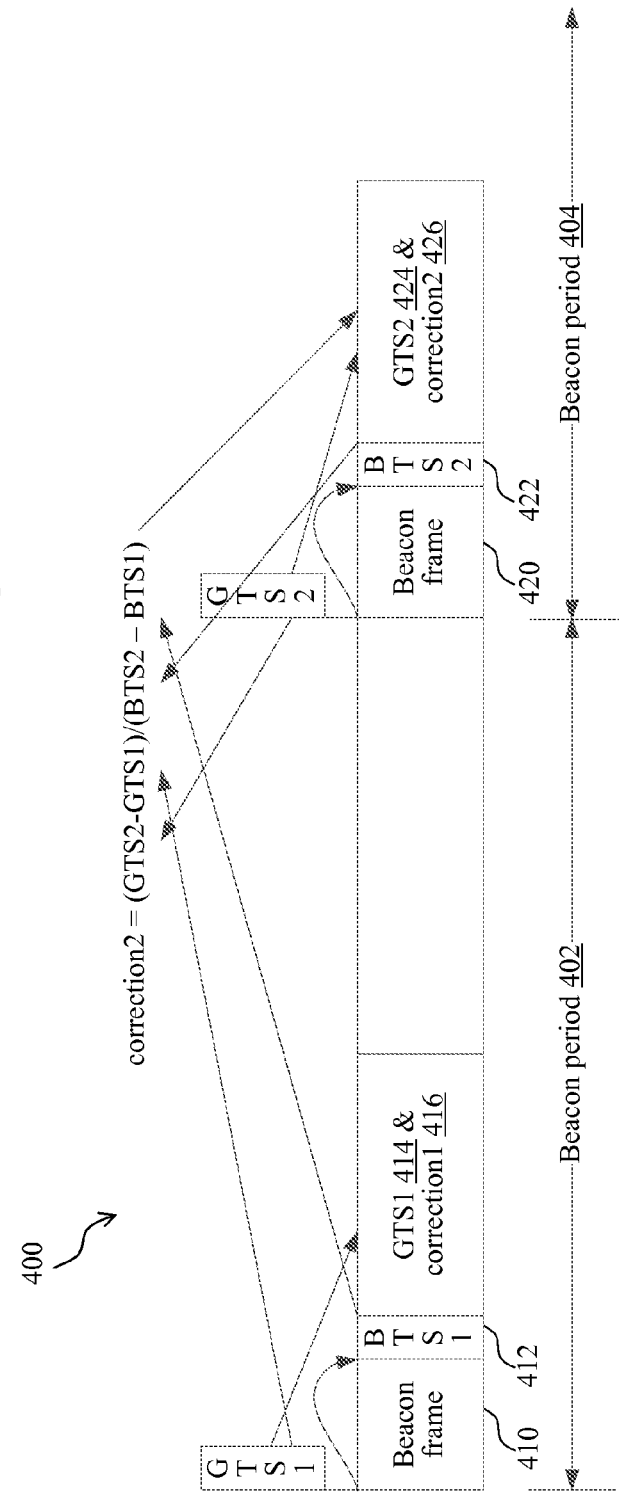
FIG. 4 illustrates another example of a sync signal that carries a time correction value.

FIG. 4 illustrates another example of a sync signal 400, which may be used to align the network clock to the global clock without needing PLL locking. Here, instead of locking a network clock using the PLL 118, the PLC node 110 may generate an accurate network clock by broadcasting, in each beacon period, a beacon frame, a beacon time stamp, a global time stamp, and a correction value. For example, a beacon period 402 may carry a beacon frame 410, a beacon time stamp (BTS1) 412, a global time stamp (GTS1) 414, and a correction value (correction1) 416. As shown in FIG.

4, the global time stamp 414 may indicate the start of the beacon frame 410 that is in reference to or measured according to the global clock (e.g., at about 0 msec of the global clock). The beacon time stamp 412 also indicates the start of the beacon frame but according to the network clock (e.g., at about 1.5 msec of the network clock). The correction value (correction1) 416 may represent any type of difference between the network clock and the global clock (e.g., as a ratio per period or linear difference).

A beacon period 404, immediately following the beacon period 402, may carry a beacon frame 420, a beacon time stamp (BTS2) 422, a global time stamp (GTS2) 424, and a correction value (correction2) 426. The correction value in each beacon period may be computed based on the time stamps of the current beacon period and the preceding beacon period. In one embodiment, the correction value 426 may be computed using equation (1):

$$\text{correction2} = (GTS2-GTS1)/(BTS2-BTS1) \qquad (1)$$

Similarly, the correction value 416 may be computed based, at least in part, on BTS1, GTS1, and the time stamps of a period preceding the beacon period 402. In an embodiment, each beacon period may have two durations: a first duration measured according to the global clock, that is, (GTS2−GTS1); and a second duration measured according to the network clock, that is, (BTS2−BTS1). The correction value represents a ratio between the first duration and the second duration.

In each beacon period, the global time stamp and the correction value may be broadcast from a master node (e.g., the PLC node 110) and received by slave PLC nodes (e.g., any of PLC nodes 120, 130, and 140) for calibrating or compensating the network clock.

At the slave PLC node, when calibration is performed at a certain network time (in the beacon period 404) according to the network clock (local_network_time_since_BTS2=local_network_time−BTS2), a corrected global clock (corrected_global_time) may be calculated using equation (2):

$$\text{corrected\_global\_time} = \text{correction2}*(\text{local\_network\_time}-BTS2)+GTS2 \qquad (2)$$

After network nodes or stations, such as the PLC nodes 120, 130, and 140, obtain a network clock, they may use the network clock as a time reference to synchronize various events to global time. Further, the synchronization mechanism may depend on whether a sensor or an actuator allows the input of an external clock signal (e.g., some devices may only run on its internal clock).

The correction value 426 may also be computed by a slave node. For example, in an alternate implementation of the approach shown in FIG. 4, a PLC slave node (e.g., any of the PLC nodes 120, 130, and 140) may store the GTS1 414 and the BTS1 412 from the previous beacon frame 410, and store the GTS2 424 and the BTS2 422 from the beacon frame 420. Then, the PLC slave node may compute the correction value 426 locally, e.g., based on equation (1).

Figure 5:
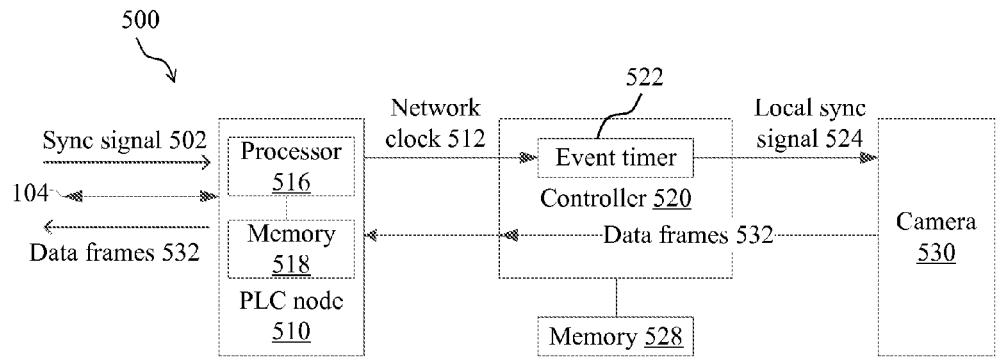
FIG. 5 shows a block diagram illustrating a partial network, in which a camera may accept an external clock signal.

FIG. 5 shows a block diagram illustrating a partial network 500, which may form part of the system 100 or the system 200. FIG. 5 illustrates a case where a sensor (e.g., camera) may accept an external clock signal. The partial network 500 comprises a PLC node 510, a controller 520, and a camera 530. The PLC node 510 may represent any of the PLC nodes 120, 130, and 140. The PLC node 510 may comprise a processor 516 for enabling the PLC node 510 to perform the actions disclosed herein and a memory 518 coupled to the processor 516 for storing data and instructions. The processor 516 may be implemented as one or more central processor unit (CPU) chips, cores (e.g., a multi-core processor), field programmable gate arrays (FPGAs), application specific integrated circuits (ASICs), and/or digital signal processors (DSPs), and/or may be part of one or more ASICs. The memory 518 may be implemented in any suitable form, such as a read only memory (ROM), a random access memory (RAM), a programmable ROM (PROM), erasable PROM (EPROM), electrically erasable PROM (EEPROM), electrically alterable ROM (EAROM), a cache, or another type of non-volatile machine readable medium. Though not shown in every figure, other PLC nodes disclosed herein (e.g., the PLC nodes 110, 120, 130, and 140) may similarly comprise processors and memory devices.

The controller 520 may be associated with (e.g., coupled to or included in) the PLC node 510 and take any suitable form. For example, the PLC node 510 may be a PLC modem, and the controller 520 may be a microcontroller or a microcomputer that facilitates communications between the PLC modem and the camera 530. The controller 520 may comprise, or be coupled to, a memory 528, which may be similar to the memory 518. The camera 530 may be a specific example of the sensor 122 or the sensor 132. As discussed earlier, when multiple cameras, each like the camera 530, are used for stereo vision processing, it may be useful to synchronize frame time of the cameras. Two or more of the PLC node 510, the controller 520, and the camera 530 may be implemented as components of one device. Alternatively, the PLC node 510, the controller 520, and the camera 530 may be implemented as separate devices, which may be co-located or distributed over a vehicle.

According to one aspect, the PLC node 510 may receive a sync signal 502 from a master node (e.g., the PLC node 110) over the PLC channel 104. The sync signal 502 may comprise information that identifies or specifies a network clock 512, which may be standalone or tied to a global clock. The network clock 512 may directly represent the global clock (e.g., when PLL locking is used in FIG. 1, the sync signal 106 contains the global clock). Alternatively, the sync signal 502 may comprise information for the PLC node 510 to align the network clock 512 to the global clock. For example, the sync signal 502 may be the sync signal 400 that comprises time stamps and correction value for time correction. In any event, the PLC node 510 may output the network clock 512 to the controller 520.

The controller 520 may comprise an event timer 522, which may be implemented in hardware and/or software. As shown in FIG. 5, the event timer 522 may use the network clock 512 to generate a local sync signal 524. The controller 520 may further output the local sync signal 524 to control a sampling clock of the camera 530. The local sync signal 524 is a general signal that may be implemented in any suitable form to directly or indirectly control timing of a local device (e.g., a sensor, an actuator, etc.). For example, the local sync signal 524 may comprise one or more frame sync pulses for driving the camera 530. More generally, the camera 530 represents a sensor which may take an external input (e.g., a clock signal) to trigger data sampling. In one embodiment, the event timer 522 may count network clock pulses and may be initialized based at least in part on a network time stamp (e.g., the beacon time stamp 312) to generate the frame sync pulse at an interval that is aligned to the network clock. The camera 530 may capture data frames 532 (e.g., images or videos) according to the network clock and send back the data frames 532, via the controller 520, to the PLC node 510. The PLC node 510 may further forward the data frames 532 to the master node over the same PLC channel 104.

Figure 6:
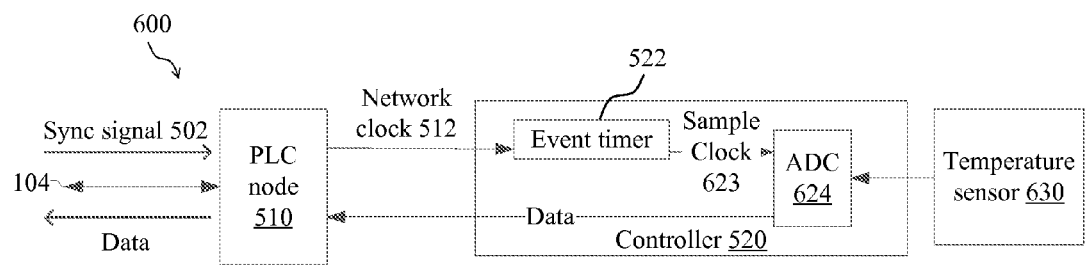
FIG. 6 shows a block diagram illustrating a partial network, in which a temperature sensor is illustrated as an example sensor device.

FIG. 6 shows a block diagram illustrating a partial network 600, where a temperature sensor 630 is illustrated. Many aspects of the partial network 600 are substantially similar to the partial network 500 and, for conciseness, are not repeated. Here, the controller 520 may further comprise an analog to digital converter (ADC) 624, which may be integrated in a microcontroller. The event timer 522 may provide a sampling clock 623 to directly drive the ADC 624. Accordingly, the ADC 624 may timestamp temperature data acquired by the temperature sensor 630 such that the temperature data is associated with the network clock.

Figure 7:
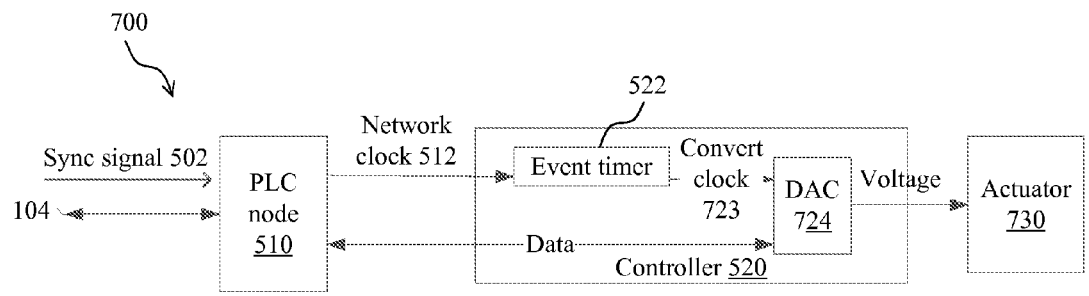
FIG. 7 shows a block diagram illustrating a partial network, in which an actuator is provided.

FIG. 7 shows a block diagram illustrating a partial network 700, where an actuator 730 is illustrated. Since many aspects of the partial network 700 may be similar to previous partial networks, repetitive details are omitted for conciseness. Here, the event timer 522 may generate an event to output a convert clock 723. The convert clock 723 may be used to drive a digital to analog converter (DAC) 724. The DAC 724 may output a commanded voltage (or other parameter) to actuate the actuator 730 (e.g., a switch). In some embodiments, the actuator 730 may not provide any data back to the controller 520, and accordingly, there may not be data frames communicated back to the master node. But in embodiments where the actuator 730 does provide data back to the master node, the data may be carried over the same PLC channel 104. Sometimes, sensors and actuators may be used in a cooperative or combined fashion. For example, temperature sensor data may be used in controlling actuators in an air conditioner (AC) system.

Figure 8:
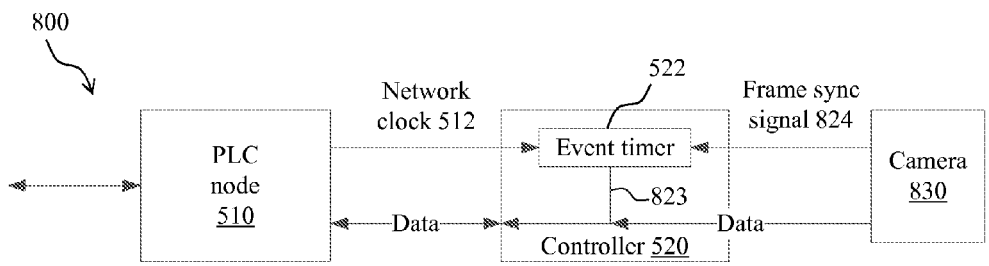
FIG. 8 shows a block diagram illustrating a partial network, in which a frame sync signal may be generated by a camera and input to a controller.

As mentioned earlier, sometimes a sensor or an actuator may only run with its local clock and not accept an external clock. FIG. 8 shows a block diagram illustrating a partial network 800, which may also form part of the system 100 or the system 200. FIG. 8 shows the case where a frame sync signal 824 may be generated by a camera 830 and input to the controller 520. More generally, the camera 830 may represent a sensor that samples data based on its own internal time-base and may not be synchronized to the network clock or any other external source. Before combining data from this sensor with other sensors, it may still be useful to know when the data is sampled in order to compensate for sampling time differences. In one embodiment, the event timer 522 may be initialized based on a beacon time stamp and driven by the network clock. When a sampling event occurs (e.g., when the camera 830 starts sampling), the event timer 522 may be notified of the sampling event (e.g., by receiving a frame sync pulse from the camera 830). The event timer 522 may then generate a network time stamp 823, according to the network clock 512, to associate with the sampling event. The network time stamp 823 is with reference to the network clock 512 so the network time stamp 823 may be used to interpolate or compensate sensor data, acquired by the camera 830, to a common point in time for combining with data from other sensors. For example, the network time stamp 823 may be sent back together with sensor data to a master node (e.g., the PLC node 110) or another slave node, which may then use the network time stamp 823 to calibrate timing of the sensor data, before combining it with data from other sensors (in this case, camera 830 may be considered a first sensor among a plurality of sensors).

According to one aspect, the master node may receive first sensor data frames from the first sensor using a local clock internal to the first sensor. The master node may receive the network time stamp 823 over the PLC channel 104 from the PLC node 510. Prior to combining the sensor data frames with other sensor data, the master node may convert the first sensor data frames from the local clock to the network clock based on the network time stamp 823.

Sometimes a PLC node (e.g., PLC node 510) may not directly output a network clock as a time reference. It may be the case that the network clock is available only as an indication of the arrival or reception time of a network clock time stamp. For example, the PLC node may provide a sync pulse, which is an indication of a beacon frame. Alternatively, the PLC node 510 may only indicate the reception of the network time stamp through delivery of message over a data interface.

Figure 9:
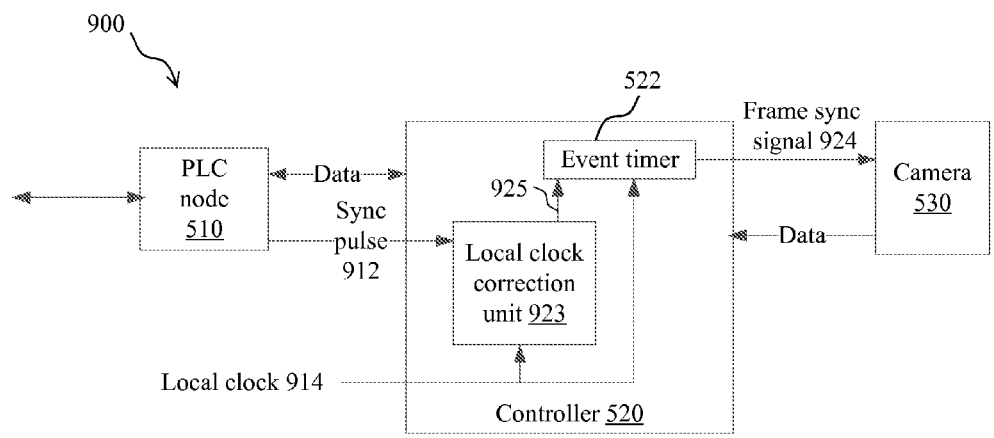
FIG. 9 shows a block diagram illustrating a partial network, in which a PLC node sends a time stamp indication to a controller to establish a network clock.

FIG. 9 shows a block diagram illustrating a partial network 900, which may be used when the PLC node 510 does not directly send a network clock to the controller 520 as a time reference. Since many aspects of the partial network 900 may be similar to previous partial networks, repetitive details are omitted for conciseness. The PLC node 510 may provide a sync pulse 912 to the controller 520. The controller 520 may comprise a local clock correction unit 923, which may correct a local clock 914 based on a network clock time stamp and an arrival indication (e.g., the arrival time of the sync pulse 912).

In one embodiment, a corrected network time 925 (corrected_time) may be computed by the local clock correction unit 923 using equations (3) and (4) below. In FIG. 9, the corrected network time 925 may be used to drive the event timer 522, which may generate a frame sync signal 924 referenced to the network clock.

$$\text{local\_correction}=(\text{timestamp2}-\text{timestamp1})/(\text{localtime2}-\text{localtime1}); \quad (3)$$

$$\text{corrected\_time}=\text{timestamp2}+\text{local\_correction}*(\text{localtime1}-\text{localtime2}), \quad (4)$$

where timestamp2 is the most recently received network time stamp;
timestamp1 is the previously received time stamp;
localtime2 is the local clock sampled at the receive indication for timestamp2; and
localtime1 is the sample of the local clock coincident with timestamp1.

Alternately, a network event time (network_event_time) may be converted into a local event time (local_event_time) using formula (5) below. The local event time may be used by the event timer 522, which may be driven by the local clock to generate the frame sync signal 924.

$$\text{local\_event\_time}=(\text{network\_event\_time}-\text{timestamp2})/\text{local\_correction}+\text{localtime2} \quad (5)$$

The approaches explained with respect to FIG. 9 may also be used when a sensor device does not take in an external clock signal, such as the configuration as shown in FIG. 8. Specifically, the frame sync signal 924 may be generated by a sensor (e.g., camera 830) and then timestamped. The time stamp may be generated by the event timer 522 in network time (corrected_time). Alternatively, the time stamp may be generated by the event timer 522 in local time, and then converted to network time using equation (5).

The time stamp reception indication approach, as shown in FIG. 9, may sometimes lead to latency due to processing in the modem or controller relative to actual transmission time over the line. A master node may take the potential latency into account when combining data frames from different PLC nodes. For example, the PLC node 110 may set a constant time offset at PLC nodes 120, 130, and 140.

Alternatively, if nodes have different latencies, a different offset correction may be applied to the local clock at each node. For example, the PLC node 110 may calculate a propagation time it takes for data frames to travel from each of the PLC nodes 120, 130, and 140 to the PLC node 110. Then, the PLC node 110 may compensate for any difference in propagation times before the combination of the sensor data frames.

Figure 10:
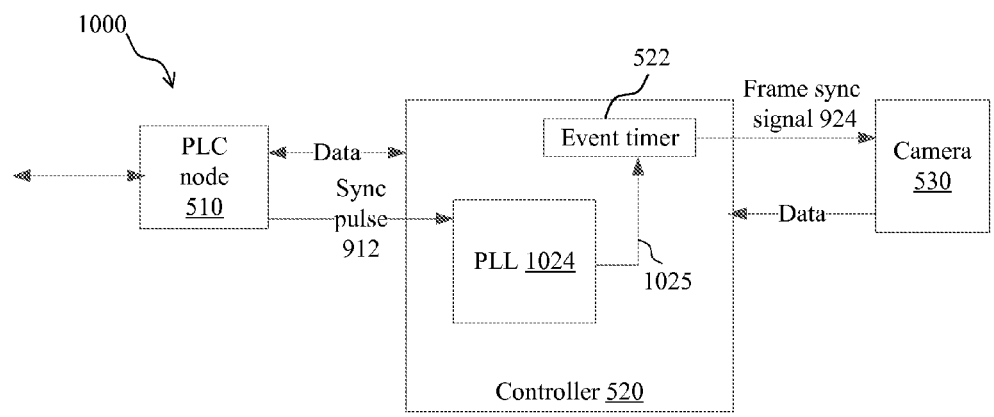
FIG. 10 shows a block diagram illustrating a partial network, in which a phase-locked loop (PLL) is driven by a time stamp indication from a PLC node.

FIG. 10 shows a block diagram illustrating a partial network 1000, where the controller 520 associated with the camera 530 includes a phase-locked loop (PLL) 1024. The PLL 1024 may be driven by a time stamp indication from the PLC node 510 (e.g., a PLC modem) and then generate a local clock 1025 that is locked to the network clock. The event timer 522 may be initialized with the network time stamp, and then run from the clock 1025 generated by the PLL 1024 to create a representation of the network clock. The event timer 522 may then generate sampling events or perform timestamping.

Figure 11:
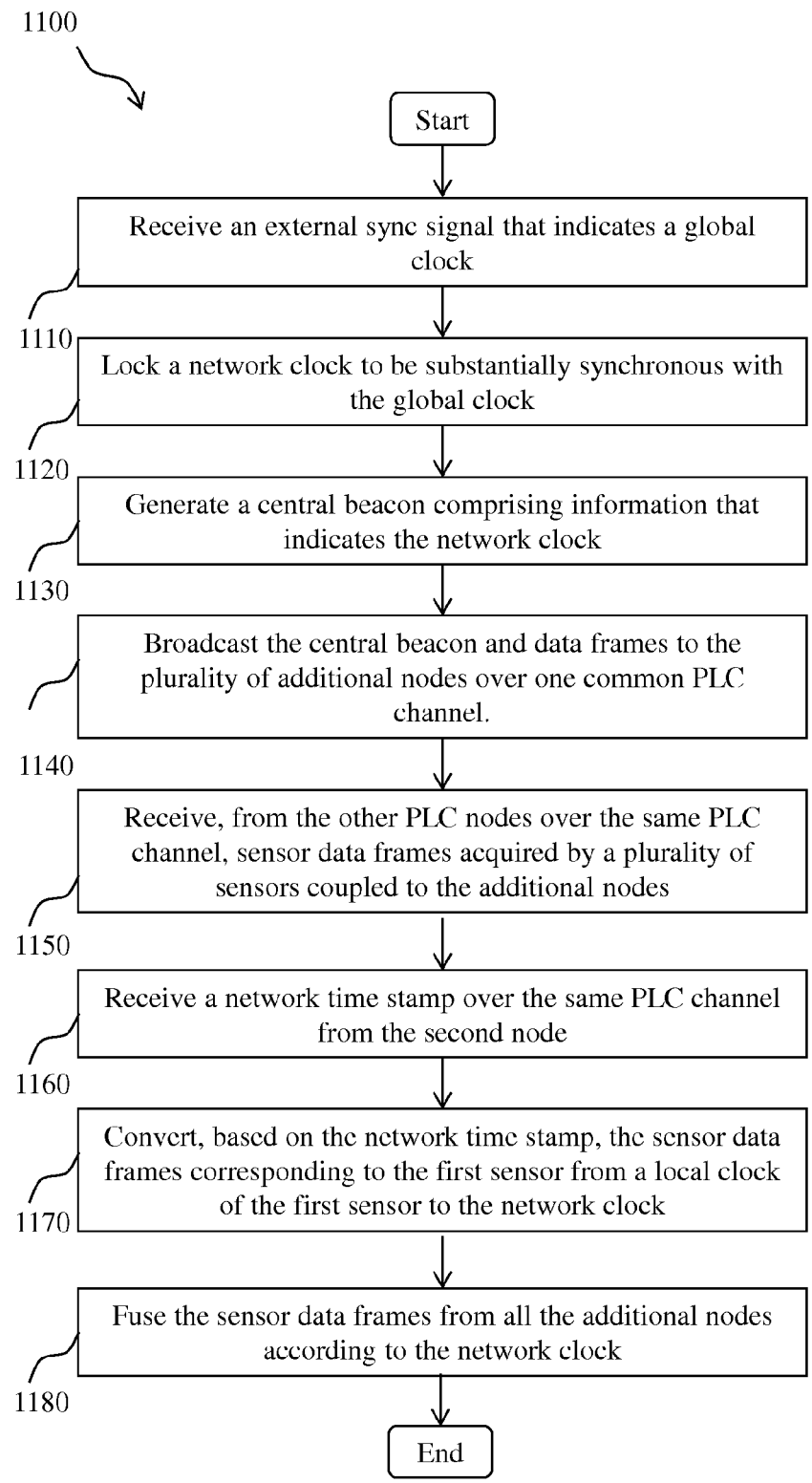
FIG. 11 shows a flowchart illustrating an exemplary process for time synchronization in a PLC network.

FIG. 11 shows a flowchart illustrating an exemplary process 1100 for time synchronization in a PLC network (e.g., the PLC network 102). The process 1100 may be implemented by a master node (e.g., the PLC node 110), which may communicate with a plurality of additional PLC nodes (e.g., the PLC nodes 120, 130, and 140). For example, the process 1100 may be performed based on instructions stored in a memory device with which the master node is in communication. Note at the outset that, depending on the application, the actions in the process 1100 may be flexibly executed within principles disclosed herein (e.g., some actions may be omitted or be exchanged in sequence) to realize various embodiments.

The process 1100 starts at an action 1110, where the master node may receive an external sync signal that indicates a global clock. The global clock may be provided by an external source such as a GPS device, a cellular modem, or another vehicle. At an action 1120, the master node may lock a network clock to be substantially synchronous with the global clock. For example, a PLL (e.g., the PLL 118) may be used in the master node to generate the network clock that is locked in with the global clock. If no global clock is necessary, the actions 1110 and 1120 may be removed or changed. At an action 1130, the master node may generate a central beacon (an example of a sync signal) comprising information that indicates the network clock. For example, the network clock may be directly included in the central beacon, or may be derived based on correction values included in the central beacon. At an action 1140, the master node may broadcast the central beacon and data frames to the plurality of additional nodes over one common PLC channel. The central beacon may be used by other PLC nodes to synchronize various events, such as sensor data sampling.

In sensor applications, at an action 1150 the master node may receive, from the other PLC nodes over the same PLC channel, sensor data frames acquired by a plurality of sensors coupled to the additional nodes. Note that timing control and sensor data fusion may be implemented on the same node or on different nodes. Thus, the sensor data frames may also be sent from one slave node to another slave node for data fusion, and both slave nodes may receive sync signals from the master node. According to one aspect, sometimes a sensor may only run on its internal clock, in which case a second PLC node may indicate when sampling occurs and communicate such information to the master node. Thus, at an action 1160, the master node may further receive a network time stamp over the same PLC channel from the second node. The network time stamp is recorded by the second node in accordance with the network clock (e.g., referencing the network clock and not the sensor clock). The network time stamp may indicate when the sensor started sampling its corresponding sensor data frames.

At an action 1170, the master node may convert, based on the network time stamp, the sensor data frames corresponding to the first sensor from a local clock of the first sensor to the network clock. The calibration or compensation may correct any timing inaccuracy at the second node. At an action 1180, the master node may fuse or combine the sensor data frames from all the additional nodes according to the network clock. The process of fusing data may involve motion compensation based on sampling time or any other algorithms. The fused data may be used for obstacle detection or any other purpose.

Figure 12:
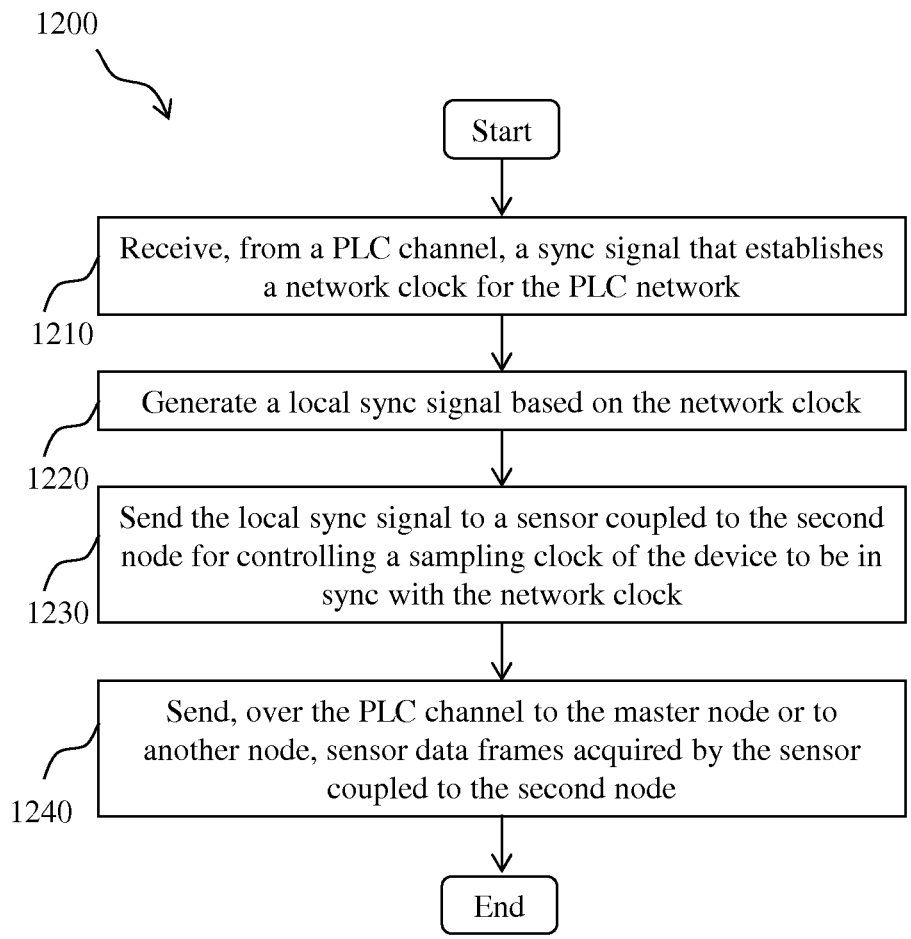
FIG. 12 shows a flowchart illustrating another exemplary process for time synchronization in a PLC network.

FIG. 12 shows a flowchart illustrating an exemplary process 1200 for time synchronization in an automotive network (e.g., the system 100 deployed within a vehicle). The automotive network may comprise a first node (master node such as the PLC node 110) and at least one second node (slave node). The process 1200 may be implemented by the second node (e.g., any of the PLC nodes 120, 130, and 140), which may communicate with the master node (e.g., the PLC node 110). For example, the process 1200 may be performed based on instructions stored in a memory device with which the second node is in communication. The second node may also comprise a controller and/or a sensor in some cases (e.g., the PLC node 510, controller 520, and a sensor) may be implemented as one device or separate devices. Similar to the process 1100, depending on the application, the actions in the process 1200 may be flexibly executed in accordance with principles disclosed herein to realize various embodiments.

The process 1200 starts at an action 1210, where the second node may receive, from a PLC channel, a sync signal that establishes a network clock for the PLC network. The network clock may be autonomously generated within the PLC network or be tied to a global clock. At an action 1220, the second node may generate a local sync signal based on the network clock. As described earlier, the local sync signal may be a frame sync pulse, a convert clock signal, a sample clock, or in any other suitable form. In an embodiment as shown in FIG. 9, the second node may lock a local clock to the network clock using a PLL.

At an action 1230, the second node may send the local sync signal to a device (e.g., sensor or actuator) coupled to the second node for controlling a sampling clock of the device to be in sync with the network clock. If the device is a sensor, at an action 1240, the second node may further send, over the PLC channel to the master node or to a third node, sensor data frames acquired by the sensor coupled to the second node.

According to one aspect, a sensor may only run on its internal clock, in which case the second node may indicate when sampling occurs and communicate such information to the master node. Specifically, the second node may generate a network time stamp, recorded according to the network clock, to indicate a sampling start time of the sensor. The network time stamp may be recorded in any suitable frequency, e.g., every beacon period, or less frequently. Further, the second node may send, over the same PLC channel to the master node, the network time stamp together with the sensor data frames.

As an example, synchronization may be accomplished by using the frame synchronization mechanism of a PLC modem, which may be implemented at the master node and each sensor node. The master node may generate and broadcast a master sync signal, which delimits the symbol and frame boundaries for all nodes in the vehicle network. Each sensor node equipped with a PLC modem may extract the sync signal to establish a local reference clock. The PLC modem at each node may also detect the validity of the sync signal from the underlying PLC protocol and indicate the validity to the sensor. Further context to the sync signal (e.g., reference to a GPS time or a larger frame counter) may be embedded in the sync signal of the modem protocol or communicated via a broadcast data channel of the PLC modem.

As disclosed herein, a master node may periodically send a sync signal to sensor nodes. The sync signal may be sent simultaneously to all nodes, or alternatively, with different schedules to different nodes (e.g., more frequently to critical nodes, but less frequently to less-important nodes). After receiving the sync signal, a sensor node may synchronize its local clock with the network clock. By periodic synchronization, the master node can be relatively confident that each sensor node would continuously operate with the same network clock. Thus, in some embodiments, with periodic synchronization in place, the master node may apply no additional synchronization when fusing data from multiple sensors.

In some cases, even if the master node may send periodic sync signals to all sensor nodes, the nodes may still have different local clocks. For example, some nodes may have a less accurate internal clock than other nodes, or a local clock may restart after a node reboots (e.g., with failure or power down). Thus, when fusing data from multiple sensors located at different parts of the vehicle, the master node may still synchronize multiple streams of data acquired by the sensor nodes. The master node may convert local clocks of each sensor to the network clock.

While various embodiments in accordance with the disclosed principles have been described above, it should be understood that they have been presented by way of example only, and are not limiting. Thus, the breadth and scope of the disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Various terms used in the present disclosure have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "immediately," "equivalent," "during," "complete," "identical," and the like should be understood to mean "substantially at the time," "substantially immediately," "substantially equivalent," "substantially during," "substantially complete," "substantially identical," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the subject matter set forth in any claims that may issue from this disclosure. Specifically and by way of example, although the headings refer to a "Field of the Disclosure," such claims should not be limited by the language chosen under this heading to describe the so-called technical field. Further, a description of a technology in the "Background" is not to be construed as an admission that technology is prior art to any subject matter in this disclosure. Neither is the "Summary" to be considered as a characterization of the subject matter set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of time synchronization implemented by a master node in a network that comprises the master node and at least a second node, the method comprising:
    generating, by the master node, a central beacon comprising information that indicates a network clock;
    transmitting the central beacon by the master node to at least the second node over a powerline communication (PLC) channel, wherein the second node is coupled to a first sensor that is not synchronized with the network clock;
    receiving, by the master node, data frames from at least the second node over the PLC channel, wherein the data frames include at least sensor data frames acquired by the first sensor that are based on a local clock internal to the first sensor;
    receiving, by the master node, a network time stamp over the PLC channel from the second node in a separate transmission from the data frames, the network time stamp being recorded by the second node in accordance with the network clock and indicating when the first sensor started sampling the sensor data frames; and
    converting, by the master node, the sensor data frames corresponding to the first sensor from the local clock internal to the first sensor to the network clock using the network time stamp.

2. The method of claim 1, further comprising:
    receiving an external synchronization (sync) signal that indicates a global clock; and generating the network clock based, at least in part, on the global clock.

3. The method of claim 2, wherein generating the network clock comprises locking the network clock to be synchronous with the global clock using a phase-locked loop (PLL) located in the master node.

4. The method of claim 1, wherein:
the network is deployed in a vehicle;
the data frames further include sensor data frames acquired by a plurality of sensors coupled to the at least second node while the vehicle is in motion, wherein the plurality of sensors are located at different positions in the vehicle; and
the method further comprises fusing the sensor data frames according to the network clock to compensate for the motion of the vehicle.

5. A first node associated with a powerline communication (PLC) network comprising a plurality of nodes, the first node comprising:
a transmitter configured to transmit, over a PLC channel, a synchronization (sync) signal to at least a second node of the plurality of nodes, wherein the second node is coupled to a first sensor, wherein the sync signal indicates a network clock for the PLC network, and wherein the first sensor is not synchronized with the network clock;
a receiver coupled to the transmitter and configured to:
receive data frames from at least the second node over the PLC channel, wherein the data frames include at least sensor data frames acquired by the first sensor that are based on a local clock internal to the first sensor; and
receive a network time stamp over the PLC channel from the second node in a separate transmission from the data frames, the network time stamp being recorded by the second node in accordance with the network clock and indicating when the first sensor started sampling the sensor data frames; and
a processor coupled to the receiver, wherein the processor is configured to:
convert, by the first node, the sensor data frames corresponding to the first sensor from the local clock internal to the first sensor to the network clock using the network time stamp.

6. The first node of claim 5, further comprising:
a second receiver configured to receive, from a source external to the PLC network, an external sync signal specifying a global clock; and
a phase-locked loop (PLL) coupled to the second receiver and configured to generate the network clock as synchronous with the global clock.

7. The first node of claim 5, wherein the sync signal is transmitted over a plurality of beacon periods, and wherein each beacon period of the sync signal comprises:
a global time stamp indicating a start of the beacon period and in reference to a global clock external to the PLC network; and
a correction value, determined based at least in part on the global time stamp, for synchronizing the network clock to the global clock, wherein each beacon period has a first duration measured according to the global clock and a second duration measured according to the network clock, and wherein the correction value represents a ratio between the first duration and the second duration.

8. The first node of claim 7, wherein the plurality of beacon periods comprises a first period and a second period immediately following the first period, and wherein the correction value is computed using an equation:

$$correction2 = (GTS2 - GTS1)/(BTS2 - BTS1), \text{ where:}$$

GTS1 denotes a global time stamp of the first period;
GTS2 denotes a global time stamp of the second period;
BTS1 denotes a beacon time stamp of the first period;
BTS2 denotes a beacon time stamp of the second period; and
correction2 denotes a correction value of the second period.

9. The first node of claim 5, wherein:
the data frames further include sensor data frames acquired by a plurality of sensors coupled to at least one additional node of the plurality of nodes,
wherein the first node is further configured to combine the sensor data frames acquired by the plurality of sensors according to the network clock.

10. The first node of claim 9, wherein:
the PLC network is deployed in a vehicle that is in motion when the sensor data frames are acquired by the plurality of sensors, wherein the plurality of sensors are located at different positions in the vehicle; and
combining the sensor data frames compensates for the motion of the vehicle.

11. The first node of claim 9, wherein the sensor data frames that correspond to at least two of the plurality of sensors propagate over the PLC channel with different propagation times, and wherein the first node is further configured to compensate for any difference in propagation times before the combination of the sensor data frames.

12. The first node of claim 5, further comprising an oscillator coupled to the transmitter and configured to generate the network clock.

13. An apparatus for data communication associated with a powerline communication (PLC) network comprising a PLC channel and a plurality of network nodes, the apparatus comprising:
a first network node coupled to a first sensor, wherein the first network node is configured to:
receive, from a master node in the network over the PLC channel, a synchronization (sync) signal indicating a network clock for the PLC network;
send data frames to the master node over the PLC channel, wherein the data frames include at least sensor data frames acquired by the first sensor that are based on a local clock internal to the first sensor, wherein the first sensor is not synchronized with the network clock;
record a network time stamp in accordance with the network clock, wherein the network time stamp indicates when the first sensor started sampling the sensor data frames; and
send, in a separate transmission from the data frames, the network time stamp to the master node over the PLC channel such that the master node converts the sensor data frames corresponding to the first sensor from the local clock internal to the first sensor to the network clock using the network time stamp.

14. The apparatus of claim 13, further comprising a controller associated with a second network node, wherein the controller comprises an event timer configured to generate a local sync signal based, at least in part, on the network clock.

15. The apparatus of claim 14, wherein the local sync signal controls a sampling clock of a second sensor that is coupled to the controller, and wherein the controller is configured to:
   send the local sync signal to the second sensor such that the sampling clock of the second sensor is in accordance with the network clock; and
   forward, to the first network node, sensor data acquired by the second sensor.

16. The apparatus of claim 15, wherein the local sync signal comprises a frame sync pulse, and wherein the sensor is a camera configured to accept the frame sync pulse.

17. The apparatus of claim 14, wherein the controller further comprises a digital to analog converter (DAC) coupled to the event timer, wherein the local sync signal is a convert clock that drives the DAC, and wherein the DAC is configured to generate, based at least in part on the convert clock, an output signal for driving an actuator coupled to the controller.

18. The apparatus of claim 13, wherein the network clock is indicated as an arrival time of a sync pulse, and wherein the apparatus further comprises a controller associated with the first network node and configured to:
   correct a local clock based, at least in part, on the arrival time of the sync pulse; and
   send the corrected local clock to a device coupled to the controller for driving the device.

19. The apparatus of claim 13, wherein the apparatus further comprises a phase-locked loop (PLL) coupled to the first network node and configured to generate a local clock that is synchronous with the network clock.

20. The apparatus of claim 13, wherein the network is an automotive network, wherein the sync signal is received over a plurality of beacon periods, and wherein each beacon period of the sync signal comprises:
   a global time stamp indicating a start of a beacon frame in the beacon period measured according to a global clock external to the automotive network; and
   a beacon time stamp indicating a start of the beacon frame measured according to the network clock.

21. The apparatus of claim 20, wherein the plurality of beacon periods comprise a first period and a second period immediately following the first period, and wherein the first network node is further configured to align a network time in the second period to the global clock by computing the following equations:

$$correction2=(GTS2-GTS1)/(BTS2-BTS1); \text{ and}$$

$$corrected\_global\_time=correction2*(local\_network\_time-BTS2)+GTS2, \text{ where:}$$

GTS1 denotes the global time stamp of the first period;
GTS2 denotes the global time stamp of the second period;
BTS1 denotes the beacon time stamp of the first period;
BTS2 denotes the beacon time stamp of the second period;
correction2 denotes the correction value of the second period;
local_network_time denotes the network time measured according to the network clock; and
corrected_global_time denotes a corrected value of the network time in the second period aligned to the global clock.

22. A method of synchronization in a powerline communication (PLC) network that comprises a master node and a second node, the method comprising:
   receiving, at the second node and over a PLC channel, a synchronization (sync) signal that establishes a network clock for the PLC network, wherein the second network node is coupled to a first sensor that is not synchronized with the network clock;
   sending, by the second node, data frames to the master node over the PLC channel, wherein the data frames include at least sensor data frames acquired by the first sensor that are based on a local clock internal to the first sensor;
   recording, by the second node, a network time stamp in accordance with the network clock, wherein the network time stamp indicates when the first sensor started sampling the sensor data frames; and
   sending, by the second node in a separate transmission from the data frames, the network time stamp to the master node over the PLC channel such that the master node converts the sensor data frames corresponding to the first sensor from the local clock internal to the first sensor to the network clock using the network time stamp.

23. The method of claim 22, wherein the network clock is indicated as an arrival time of a sync pulse, wherein the method further comprises correcting, by the second node, a local clock based on the arrival time of the sync pulse to generate a corrected local clock, and wherein a local sync signal is generated based on the corrected local clock.

24. The method of claim 22, further comprising:
   receiving, at the second node and from one or more third nodes, sensor data frames acquired by sensors associated with the one or more third nodes; and
   fusing, by the second node, the sensor data frames according to the network clock, wherein the network clock is tied to a global clock external to the PLC network, and wherein generating the local sync signal comprises locking a local clock to the network clock using a phase-locked loop (PLL).

* * * * *